(12) United States Patent
Vetterli

(10) Patent No.: US 11,045,042 B2
(45) Date of Patent: Jun. 29, 2021

(54) FULLY AUTOMATIC BEVERAGE MACHINE FOR FRESHLY BREWED HOT BEVERAGES

(71) Applicant: Franke Kaffeemaschinen AG, Aarburg (CH)

(72) Inventor: Heinz Vetterli, Wangen (CH)

(73) Assignee: Franke Kaffeemaschinen AG, Aarburg (CH)

( * ) Notice: Subject to any disclaimer, the term of this patent is extended or adjusted under 35 U.S.C. 154(b) by 0 days.

(21) Appl. No.: 16/461,628

(22) PCT Filed: Nov. 16, 2017

(86) PCT No.: PCT/EP2017/079475
§ 371 (c)(1),
(2) Date: May 16, 2019

(87) PCT Pub. No.: WO2018/108437
PCT Pub. Date: Jun. 21, 2018

(65) Prior Publication Data
US 2019/0350405 A1    Nov. 21, 2019

(30) Foreign Application Priority Data
Dec. 16, 2016  (DE) .................... 10 2016 124 681.6

(51) Int. Cl.
*A47J 31/60*  (2006.01)
*A47J 31/52*  (2006.01)
(Continued)

(52) U.S. Cl.
CPC .............. *A47J 31/60* (2013.01); *A47J 31/52* (2013.01); *A47J 31/545* (2013.01); *B08B 9/0321* (2013.01); *B08B 3/08* (2013.01)

(58) Field of Classification Search
CPC combination set(s) only.
See application file for complete search history.

(56) References Cited

U.S. PATENT DOCUMENTS 9,214,017 B2   12/2015   Turi et al.
2004/0118291 A1   6/2004   Carhuff et al.
(Continued)

FOREIGN PATENT DOCUMENTS

CH          709738       12/2015
DE     202010010509      11/2011
(Continued)

*Primary Examiner* — Erin F Bergner
(74) *Attorney, Agent, or Firm* — Volpe Koenig

(57) ABSTRACT

A fully automatic beverage machine for preparing freshly brewed hot beverages, having at least one hot-water generator (10, 20), a brewing device (50) to which hot water can be supplied from the hot water generator (10, 20), and a water pump (11, 21) which pumps drinking water from a drinking water supply line (30) to the hot water generator (10, 20). The hot water generator (10, 20) is a continuous flow heater and a flowmeter (12, 22) for determining the volume of drinking water pumped by the water pump (11, 21). Additionally, the fully automatic beverage machine is equipped with an automatic decalcification system (40) for automatically decalcifying the continuous flow heater (10, 20). The decalcification system has a mixing container (41) for mixing a descaling solution, a receiving chamber for a storage container (42) for liquid decalcifier concentrate, and a metering pump (43) for pumping decalcifier concentrate out of the storage container (42) into the mixing container (41) in a metered manner, wherein the descaling solution is mixed from decalcifier agent concentrate and water in the mixing container. The water pump (11, 21) can be connected to a removal line (49) of the mixing container (41) in a switchable manner on the suction side via a first directional valve (44) in order to pump the descaling solution from the mixing container (41) to the hot water generator (10, 20) in the switched valve position of the first directional valve (44), and the water pump (11) can be connected to a water supply line (47) of the mixing container (41) in a switchable manner (Continued)

on the pressure side via a second directional valve (45) in order to pump drinking water to the mixing container (41) in the switched valve position of the second directional valve (45).

7 Claims, 1 Drawing Sheet

(51) Int. Cl.
*A47J 31/54* (2006.01)
*B08B 9/032* (2006.01)
*B08B 3/08* (2006.01)

(56) References Cited

U.S. PATENT DOCUMENTS

2009/0293733 A1* 12/2009 Martin .................. G07F 13/065
99/280
2016/0249767 A1* 9/2016 Santini .................... C02F 5/025
99/290

FOREIGN PATENT DOCUMENTS

| DE | 102013106148 | 12/2014 |
| DE | 102014113161 | 3/2016 |
| EP | 2363051 | 9/2011 |
| EP | 2561778 | 2/2013 |
| EP | 2705784 | 3/2014 |
| EP | 3078310 | 3/2016 |
| WO | 2004058019 | 7/2004 |
| WO | 2013023963 | 2/2013 |
| WO | 2013189869 | 12/2013 |

* cited by examiner

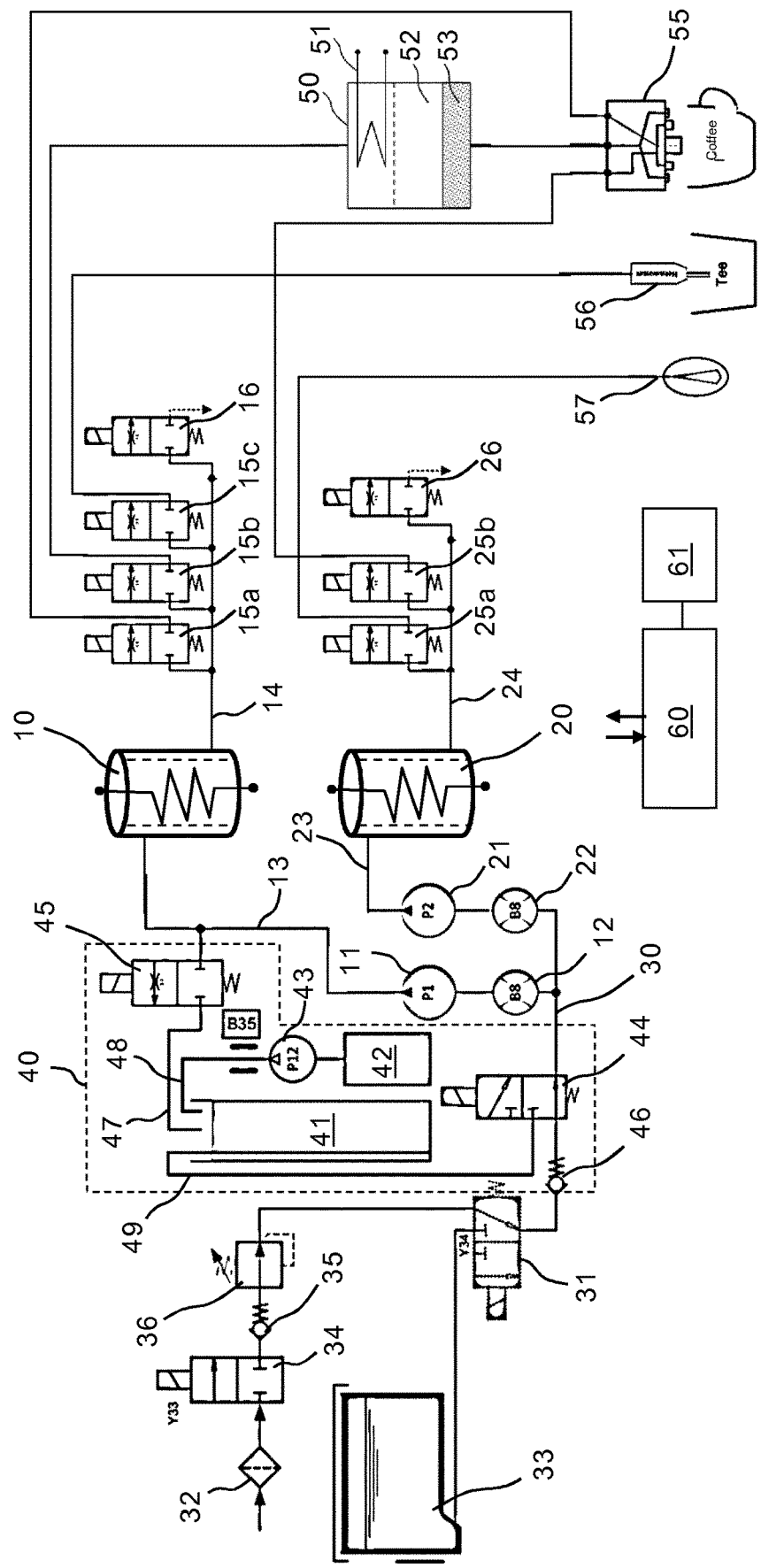

FULLY AUTOMATIC BEVERAGE MACHINE FOR FRESHLY BREWED HOT BEVERAGES

BACKGROUND

The present invention relates to a fully automatic beverage machine for preparing freshly brewed hot beverages, in particular coffee beverages, having at least one hot water generator, having a brewing apparatus to which hot water is able to be supplied from the hot water generator, having a water pump which delivers drinking water from a drinking water supply line to the hot water generator, and having a throughflow meter for determining the volume of drinking water delivered by the water pump.

Fully automatic coffee machines which prepare freshly brewed coffee beverages in a portioned manner at the push of a button are known in the prior art. The hot water required for this purpose is normally held in a hot water boiler, with the result that there is no need for a long heating-up period.

It is also known that, in the case of fully automatic coffee machines of said type, decalcification of the hot water generator has to be carried out from time to time. In this regard, for example solutions such as in WO 2013/023963 A1 or EP 2705784 A1, in which a cartridge with a water-soluble decalcifying agent is inserted, or connected to the apparatus, in order for a decalcification process to be carried out, are known. In CH 709738, a decalcifying agent application apparatus with a decalcifying solution held in a container of variable volume is connected to the coffee machine.

Known from DE 10 2013 106 148 A1 is an automatic beverage machine having a water pump, a heating device for heating water, a brewing chamber to which hot water is able to be supplied from the hot water generator, and having a throughflow meter for the purpose of determining the quantity of water delivered by the pump. It is possible to connect to the fresh water supply line a decalcification apparatus, with which a decalcifying agent can be added to the fresh water sucked in by the water pump. The dosing of the decalcifying agent is intended to be set via a reduction in the delivery power of the water pump. The dosing of the decalcifying agent thus depends on the flow speed of the fresh water. However, since said flow speed can in turn depend on the calcification state of the hot water preparation means, the dosing of the decalcifying agent is not precise.

SUMMARY

The object of the present invention is to specify a fully automatic beverage machine for preparing freshly brewed hot beverages, in particular coffee beverages, by which hot beverages are able to be prepared quickly and reliably, which requires little maintenance and little repair, and which can be operated by a user or operator in a simple and operationally reliable manner.

The present invention thus uses, as a departure from existing fully automatic coffee machines having a boiler for hot water preparation, a light and compact continuous flow heater for hot water preparation. A corresponding continuous flow heater which can be used in the context of the present invention is specified for example in WO 2013/189869 A1, to the full content of which reference is made hereby for the purpose of avoiding unnecessary repetitions.

The invention, however, is based on the realization that, with a continuous flow heater which is suitable in the context of the present invention, due to the high temperatures required for heating the water quickly and to the narrow, but long, flow paths in the continuous flow heater, the latter is prone to calcification. In the context of the present invention, it is therefore provided that the fully automatic beverage machine is equipped with a decalcification system for automatically decalcifying the continuous flow heater. In this way, it is possible for the continuous flow heater to be decalcified at any time and without extensive effort as soon as this is necessary. Generally this happens at the beginning or after completion of an operation by the operator at a simple push of a button. The fully automatic beverage machine then carries out the requisite steps for decalcifying the continuous flow heater without further operating steps, such as for example inserting a decalcifier cartridge or the like, being necessary.

For this purpose, the decalcification system of the fully automatic beverage machine according to the invention comprises a mixing container for the mixing of a decalcifying agent solution, a receiving chamber for a storage container for liquid decalcifier concentrate, and a dosing pump for delivering decalcifier concentrate from the storage container into the mixing container in a dosed manner. Consequently, as required, that is to say whenever a decalcifying process is to be carried out, in the mixing container, the decalcifying agent solution is mixed from the liquid decalcifier concentrate, which is delivered by the fully automatic beverage machine automatically via the dosing pump from the storage container into the mixing container, and water.

The use of a liquid decalcifier concentrate has the advantage that a quantity of concentrate can be stored for a multiplicity of decalcification processes in the fully automatic beverage machine, with the result that, even with frequent decalcification processes, replacement or refilling of the storage container is necessary only at relatively long time intervals. This considerably reduces the required maintenance effort and allows the operator to regularly carry out the decalcification without technical knowledge. Moreover, a liquid decalcifier concentrate can be dosed in a simple and operationally reliable manner via a dosing pump, with the result that the decalcifying agent solution can be mixed in an automated manner and with at all times the correct, desired dosing.

The fully automatic beverage machine also comprises a water pump which extracts drinking water from a drinking water supply line, for example a water connection or a water container inserted into the fully automatic beverage container, and delivers it to the hot water generator. Furthermore, a throughflow meter for determining the volume of drinking water delivered by means of the water pump is provided. In the context of the present invention, such a throughflow meter for determining volume offers advantages in several respects: Firstly, it is possible via the throughflow meter to measure a volume of fresh water which is introduced into the mixing container via the water pump in order for the decalcifying agent solution to be mixed. Secondly, with the aid of the throughflow meter, it is possible to determine a rate of throughflow, that is to say the volumetric quantity per unit time, which flows through the continuous flow heater during the operation of the fully automatic beverage machine. A calcification state of the continuous flow heater can be deduced from this, and so a message that an automatic decalcification process is required and should be started at an opportune moment can be generated in good time. In addition, the throughflow meter also of course serves for measuring the fresh water portions for the preparation of different hot beverages.

According to the invention, it is furthermore provided that, on the suction side, the water pump is able to be connected to the mixing container in a switchable manner via a first directional valve, the decalcifying agent solution being held or mixed in said mixing container. In the switched valve position of the first directional valve, it is thus possible for the decalcifying agent solution to be delivered from the mixing container to the hot water generator via the water pump. Furthermore, on the pressure side, the water pump is able to be connected to a water supply line of the mixing container in a switchable manner via a second directional valve. For the purpose of mixing a decalcifying agent solution in the mixing container, in the switched valve position of the second directional valve, it is thus possible for drinking water to be delivered by the water pump to the mixing container.

The fully automatic beverage machine expediently has a control apparatus which infers a calcification state of the hot water generator from measurement values of the throughflow meter and, when a predefined value is reached, in particular for a maximum throughput time or a minimum rate of throughflow, generates a message that an automatic decalcification process should be carried out. An operator of the fully automatic beverage machine thus knows that he or she should start a decalcification process at the next opportune moment. However, normal operation of the fully automatic beverage machine may firstly be continued in the usual way and without significant impairments.

In the context of the present invention, it may furthermore be provided that, downstream of the hot water generator in the flow direction, there is arranged a third directional valve, by way of which the fluid flow from the hot water generator can be conducted into a wastewater line or a collecting container for waste water. In the context of an automatic decalcification process, said third directional valve is brought into a switching position in which, after flowing through the continuous flow heater, the decalcifying agent solution is not conducted to the brewing apparatus and, from there, further to a beverage outlet, but passes directly into a wastewater line or a corresponding collecting container. The fact that the decalcifying agent solution is not discharged to the normal beverage outflow means that inadvertent faulty operation, which could lead for example to a discharge of decalcifying agent solution into a beverage vessel of a customer, is avoided.

For the purpose of carrying out decalcification processes in a fully automatic manner, in the context of the present invention, a programmable control apparatus which is designed or programmed such that, for the purpose of carrying out an automatic decalcification process, it actuates the dosing pump in order for a predetermined quantity of decalcifier concentrate to be delivered from the storage container into the mixing container, which is further programmed such that it switches the second directional valve in order to connect the water pump to the water supply line of the mixing container and actuates the water pump in order for a predefinable quantity of drinking water to be delivered into the mixing container, and which is further programmed such that it switches the first directional valve in order to connect the water pump to the extraction line of the mixing container on the suction side and to deliver the decalcifying agent solution from the mixing container to the hot water generator, is expedient and advantageous.

Provision is also made in the context of the present invention for a method for decalcifying in an automated manner a hot water generator in a fully automatic beverage machine which serves for preparing freshly brewed hot beverages. For the purpose of carrying out an automated decalcification process, a predetermined quantity of decalcifier concentrate is delivered from a storage container into a mixing container by means of a dosing pump. Subsequently, a water pump of the fully automatic beverage machine is connected to a water supply line of the mixing container and a predefinable quantity of drinking water is delivered into the mixing container by means of the water pump. Finally, the water pump is connected on the suction side to the mixing container and on the pressure side again to the hot water generator and the decalcifying agent solution is delivered from the mixing container to the hot water generator by means of the water pump.

BRIEF DESCRIPTION OF THE DRAWINGS

Further advantages and properties of the present invention will emerge from the following description of an exemplary embodiment on the basis of the single FIGURE.

The sole FIGURE shows a water flow diagram of a fully automatic beverage machine, which has two continuous flow heaters and an integrated decalcification system for automatically decalcifying the continuous flow heaters.

DETAILED DESCRIPTION

In the FIGURE, the construction of an apparatus for preparing hot beverages, as used for example in the case of a fully automatic coffee machine, is shown in a so-called water flow diagram. A continuous flow heater 10 serves for generating hot water with which hot beverages are prepared. A water pump 11 and a throughflow meter 12 are situated upstream of the continuous flow heater 10 in the water flow direction and are connected to the continuous flow heater 10 via a line 13. Multiple directional valves 15*a*, 15*b*, 15*c* and 16 are connected to the hot water outlet of the continuous flow heater 10 via a line 14.

In addition to the continuous flow heater 10 provided for hot water preparation, the apparatus has a second continuous flow heater 20, which serves for generating steam which can likewise serve for the preparation of hot beverages, for example for reheating or for frothing milk or other beverages. The second continuous flow heater 20, which serves here for generating steam, is, in the context of the present invention, also likewise to be understood as being a hot water generator in the broader sense.

A water pump 21 and a throughflow meter 22 are likewise situated upstream of the second continuous flow heater 20 and are connected to the inflow of the continuous flow heater 20 via a line 23. Various directional valves 25*a*, 25*b* and 26 are connected to the hot water or steam outlet of the continuous flow heater 20 via a line 24.

In the exemplary embodiment, the two throughflow meters 12, 22 are each arranged upstream of the associated pumps 11, 21. However, it would be possible in the same way for the throughflow meters 12, 22 to be arranged downstream of the associated water pumps 11, 21 in the flow direction. On the suction side, the two water pumps 11, 21 are connected to a drinking water connection 32 of the public supply network, or to a water tank 33 provided at or in the unit, via a drinking water supply line 30 and an optional switching valve 31. In the case of a connection to a public supply network 32, a shut-off valve 34, a check valve 35 and a pressure reducer 36 are provided in the supply line.

The water pump 11 delivers drinking water from the connected drinking water supply line 30 via the line 13 to the continuous flow heater 10, from where the hot water can be delivered via the directional valve 15b to a brewing assembly 50. The brewing assembly 50 comprises in a manner known per se a heating means 51, by which the supplied hot water can be brought to a boil or the brewing assembly can be preheated, and a brewing chamber 52, into which portioned, freshly ground coffee powder 53 is introduced. A brewing assembly which can be used in the context of the present invention is described for example in EP 2561778 A1, to the full content of which reference is made hereby for the purpose of avoiding unnecessary repetitions.

The brewing assembly 50 is designed such that it can be opened in order to introduce a portioned quantity of coffee powder, the latter beforehand having been freshly ground in a portioned manner in a grinder of the fully automatic coffee machine. Moreover, the remaining coffee grounds can, with the brewing assembly open, be ejected into a grounds container after the brewing process. The brewing assembly also has a movable piston (not illustrated), which compresses the introduced coffee powder against a brewing sieve situated in the brewing chamber. After the piston has moved back, the coffee powder thus compressed can be flowed through by the brewing water from the continuous flow heater 10, which brewing water is subjected to the pressure of the pump 11. The ready brewed coffee is conducted from the brewing assembly 50 to an outflow 55 for coffee beverages via an outlet line. Hot water can be conducted directly to the outflow 55 via the directional valve 15a, for example for cleaning purposes or for preparing instant beverages. Furthermore, hot water can, via the directional valve 15c, also be conducted to a separate hot water outlet 56, which serves for example for preparing tea.

Either steam generated by the second continuous flow heater 20 can be conducted to a so-called steam lance 57 via the directional valve 25a, in order for example to froth milk, or steam can also be conducted to the outflow 55 via the directional valve 25b, in order for example to heat or to froth milk supplied via a separate line (not shown).

The directional valves 16 and 26 serve for connecting the hot water outlet of the continuous flow heater 10 or of the continuous flow heater 20 to a so-called drainage means, that is to say a wastewater line or a collecting container for wastewater. This is necessary, especially for the purpose of decalcifying the associated continuous flow heater 10, 20, in order to discharge the decalcifier solution conducted through the continuous flow heaters 10, 20.

An integrated decalcification system 40 serves for decalcifying the continuous flow heaters 10, 20 and will be described in the following text. The decalcification system 40 comprises a mixing container 41, a storage container 42 for liquid decalcifier concentrate, and a dosing pump 43. The common drinking water supply line 30 situated on the suction side of the water pumps 11, 21 can, via a switching valve 44, be connected to an intake line 49 which extends to the bottom of the mixing container 41, in order to suck in a decalcifying agent solution from the mixing container 41, and to deliver said solution to the continuous flow heaters 10, 20, for the purpose of decalcification. Beforehand, the decalcifying agent solution is mixed in the mixing container 41 in that, via the dosing pump 43, a dosable quantity of the decalcifier concentrate is delivered into the mixing container via the supply line 48.

Via a directional valve 45, which is connected to the supply line 13 connected on the pressure side to the pump 11, fresh water can be introduced via the supply line 47 into the mixing container by means of the water pump 11. Here, the quantity of the fresh water introduced can be determined with the aid of the throughflow meter 12, with the result that, after a predetermined quantity of water has been introduced into the mixing container 41, the valve 45 can be closed.

After the decalcifying agent solution has been mixed in the mixing container 41, the supply line 30 can be connected to the intake line 49 via the valve 44. Subsequently, the drainage valve 16 is opened and, via the water pump 11, the decalcifying agent solution is delivered from the mixing container 41 through the continuous flow heater 10. Subsequently, the switching valve 44 is switched back into the operating position again, in which position the supply line 30 is connected to the public water connection 32 or to the water tank 33, and, by means of the water pump 11, the continuous flow heater 10 is once again flushed with fresh water. A check valve 46 prevents decalcifying agent solution possibly still present in the supply line 30 from being able to flow back into the fresh water tank 33. The continuous flow heater 20 can also be decalcified and cleaned in the same way in that, via the water pump 21, decalcifying agent solution is delivered from the mixing container 41 through the continuous flow heater 20 and via the drainage valve 26 into the outflow.

Even though the continuous flow heater 20 serves for generating steam in the present exemplary embodiment, it is, in the context of the present invention, likewise to be understood as being a hot water generator in the broader sense. It is self-evident that the directional valve 45 of the decalcification system 40 may be connected, instead of to the water pump 11 via the line 13, also to the water pump 21 via the line 23. The continuous flow heaters 10, 20 which are used in the present exemplary embodiment are compact continuous flow heaters in the form of so-called heating cartridges. These consist of a thin-walled cylindrical inner body, which is provided with electrical heating wires and whose shell surface is provided on the outside with a helical groove, which is delimited outwardly by an outer cylindrical shell and thus forms a flow path for the supply water to be heated. Such a heating cartridge is described for example in the document WO 2013/189869 A1, to the full content of which reference is made hereby for the purpose of avoiding unnecessary repetitions.

The fully automatic coffee machine described in the exemplary embodiment also has a programmable control unit 60 and a user interface 61 which is connected to the control unit 60, for example in the form of a touch-sensitive display or some other display and input unit. The functions of the water pumps 11, 21 and all the directional valves, and the activation of the continuous flow heaters 10, 20 and the decalcification system 40 and the dosing pump 43 of the latter are actuated via the control unit 60. The control unit also reads the measurement values of the throughflow meters 12, 22. Consequently, via the control unit 60, it is possible both for the preparation of coffee beverages or other hot beverages to be controlled during normal operation and for decalcification of the continuous flow heaters 10, 20 by means of the decalcification system 40 to be carried out. Via the two throughflow meters 12, 22, the control unit 60 is able to determine the duration until a predefinable quantity of water has flowed through the associated continuous flow heaters 10 and 20. The decalcification state of the continuous flow heaters 10, 20 can be estimated from this, and so the control unit can, via the graphical user interface 61, generate a message that an automatic decalcification process is required. A user is then able to initiate or activate the automatic decalcification process via corresponding input means at the user interface 61.

For the purpose of carrying out the decalcification process, as already described, firstly a dosed quantity of decalcifier concentrate is delivered from the storage container 42 into the mixing container 41, and then the mixing container 41 is filled with fresh water via the directional valve 45. The decalcifying agent solution 41 is then conducted through the corresponding continuous flow heater 10 or 20 in order to decalcify it. Subsequently, flushing with fresh water takes place. The fully automatic coffee machine is then ready for operation again.

As a decalcifier concentrate, use may be made for example of citric acid, malic acid or tartaric acid in the form of a concentrated solution. The decalcifier concentrate may either be introduced into disposable packs or added to a fillable storage container, as required. Here, the storage container may be installed in a fixed manner in the fully automatic beverage machine, preferably however being able to be extracted for the purpose of filling or replacement. In the case of a disposable pack, said pack may, for example, be opened, or connected to the dosing pump, by being pierced with an extraction lance or a pin.

The invention claimed is:

1. A fully automatic beverage machine for preparing freshly brewed hot beverages, the beverage machine comprising:
    at least one hot water generator,
    a brewing apparatus to which hot water is able to be supplied from the hot water generator,
    a water pump which delivers drinking water from a drinking water supply line to the hot water generator,
    a throughflow meter for determining a volume of drinking water delivered by the water pump,
    the hot water generator is a continuous flow heater,
    a decalcification system for automatically decalcifying the continuous flow heater, the decalcification system comprises
    a mixing container for the mixing of a decalcifying agent solution,
    a receiving chamber for a storage container for liquid decalcifier concentrate, and
    a dosing pump for delivering decalcifier concentrate from the storage container into the mixing container in a dosed manner, the decalcifying agent solution being mixed from decalcifier concentrate and water in said mixing container,
    on the suction side, the water pump is connectable to an extraction line of the mixing container in a switchable manner via a first valve in order, in a switched valve position of the first valve, to deliver the decalcifying agent solution from the mixing container to the hot water generator, and
    on the pressure side, the water pump is connectable to a water supply line of the mixing container in a switchable manner via a second valve in order, in the switched valve position of the second valve, to deliver drinking water to the mixing container for mixing the decalcifying agent solution.

2. The fully automatic beverage machine as claimed in claim 1, further comprising a control apparatus configured to actuate the water pump and, via the throughflow meter, to measure a fresh water volume which is introduced into the mixing container via the water pump in order to mix the decalcifying agent solution.

3. The fully automatic beverage machine as claimed in claim 2, wherein the control apparatus is configured to infer a calcification state of the hot water generator from meter values of the throughflow meter and, when a predefined value is reached to generate a message that an automatic decalcification process is required.

4. The fully automatic beverage machine as claimed in claim 1, wherein downstream of the hot water generator in a flow direction, there is arranged a third valve, by which the fluid flow from the hot water generator is conductible directly into a wastewater line or a collecting container instead of in a direction of the brewing apparatus or a beverage outlet.

5. The fully automatic beverage machine as claimed in claim 1, further comprising a control apparatus which is programmed such that, for carrying out an automatic decalcification process, the control apparatus actuates the dosing pump in order for a predetermined quantity of decalcifier concentrate to be delivered from the storage container into the mixing container, and is further programmed such that the control apparatus switches the second valve in order to connect the water pump to the water supply line of the mixing container and actuates the water pump in order for a predefinable quantity of drinking water to be delivered into the mixing container, and which is further programmed such that the control apparatus switches the first valve in order to connect the water pump to the mixing container on the suction side and to deliver the decalcifying agent solution from the mixing container to the hot water generator.

6. A method for decalcifying in an automated manner a hot water generator in a fully automatic beverage machine for preparing freshly brewed hot beverages, the method comprising for carrying out an automatic decalcification process:
    delivering a predetermined quantity of liquid decalcifier concentrate from a storage container into a mixing container using a dosing pump,
    connecting a water pump of the fully automatic beverage machine to a water supply line of the mixing container and, for the purpose of mixing a decalcifying agent solution,
    delivering a predefinable quantity of drinking water into the mixing container using the water pump,
    subsequently connecting the water pump on a suction side to the mixing container, and
    delivering the decalcifying agent solution from the mixing container to the hot water generator using the water pump.

7. The fully automatic beverage machine as claimed in claim 3, wherein the predefined value is for a maximum throughput time or a minimum rate of throughflow.

* * * * *